US007328232B1

(12) United States Patent
Osborn et al.

(10) Patent No.: US 7,328,232 B1
(45) Date of Patent: Feb. 5, 2008

(54) DISTRIBUTED MULTIPROCESSING SYSTEM

(75) Inventors: Andrew R. Osborn, Binfield (GB); Martyn C. Lord, Uxbridge (GB)

(73) Assignee: BEPTECH Inc., Grand Rapids, MI (US)

( * ) Notice: Subject to any disclaimer, the term of this patent is extended or adjusted under 35 U.S.C. 154(b) by 816 days.

(21) Appl. No.: 09/692,852

(22) Filed: Oct. 20, 2000

Related U.S. Application Data

(60) Provisional application No. 60/241,233, filed on Oct. 18, 2000.

(51) Int. Cl.
G06F 15/16 (2006.01)
G06F 15/173 (2006.01)

(52) U.S. Cl. .................. 709/201; 709/217; 709/238

(58) Field of Classification Search ................ 709/200, 709/201, 205, 212, 243, 244, 217, 238; 700/2, 700/6
See application file for complete search history.

(56) References Cited

U.S. PATENT DOCUMENTS

| 4,276,594 | A |   | 6/1981  | Morley |
|-----------|---|---|---------|--------|
| 4,402,082 | A | * | 8/1983  | Cope ........................... 714/712 |
| 4,435,780 | A |   | 3/1984  | Herrington et al. |
| 4,517,637 | A | * | 5/1985  | Cassell ........................... 700/9 |
| 4,724,520 | A |   | 2/1988  | Athanas et al. |
| 4,757,497 | A |   | 7/1988  | Beierle et al. |
| 4,777,487 | A |   | 10/1988 | Boulton et al. |
| 4,862,350 | A | * | 8/1989  | Orr et al. ..................... 709/213 |
| 5,193,149 | A |   | 3/1993  | Awiszio et al. |
| 5,276,789 | A |   | 1/1994  | Besaw et al. |
| 5,296,936 | A |   | 3/1994  | Pittas et al. |
| 5,448,698 | A | * | 9/1995  | Wilkes ........................ 709/245 |
| 5,524,217 | A | * | 6/1996  | Sone et al. .................. 710/108 |
| 5,557,778 | A |   | 9/1996  | Vaillancourt |
| 5,581,691 | A |   | 12/1996 | Hsu et al. |

(Continued)

FOREIGN PATENT DOCUMENTS

JP         63106064         5/1988

(Continued)

OTHER PUBLICATIONS

Charles Spurgeon, "Ethernet: The Definitive Guide", Feb. 2000, O'Reilly, Section 8.3.*

(Continued)

*Primary Examiner*—Glenton B. Burgess
*Assistant Examiner*—Aaron Strange
(74) *Attorney, Agent, or Firm*—Howard & Howard Attorneys, P.C.

(57) ABSTRACT

A distributed multiprocessing system includes a number of nodes 1-6 interconnected through a central signal routing hub. Each of the nodes 1-6 are preferably connected to an actuator and include a processor for processing information. The nodes 1-6 also assign addresses to the processed information. Communication links interconnect the processors with the hub for transmitting the processed information between the processors and the hub. The central routing hub includes a sorter for receiving processed information from the processors. The hub and sorter identify a destination of the processed information and send the processed information without modification over an associated communication link to an addressed processor. The system of the subject invention creates a virtually seamless stream of data for real time compilation of information during a testing of a vehicle.

50 Claims, 9 Drawing Sheets

U.S. PATENT DOCUMENTS

| | | | |
|---|---|---|---|
| 5,594,870 | A | 1/1997 | Harris, Jr. et al. |
| 5,596,723 | A | 1/1997 | Romohr |
| 5,617,418 | A | 4/1997 | Shirani et al. |
| 5,631,839 | A * | 5/1997 | Lemoine ............... 700/108 |
| 5,784,557 | A | 7/1998 | Oprescu |
| 5,802,391 | A | 9/1998 | Hwang |
| 5,884,046 | A * | 3/1999 | Antonov ............... 709/238 |
| 5,905,725 | A * | 5/1999 | Sindhu et al. ......... 370/389 |
| 5,905,868 | A * | 5/1999 | Baghai et al. ......... 709/224 |
| 5,933,607 | A | 8/1999 | Tate et al. |
| 5,937,388 | A | 8/1999 | Davis et al. |
| 5,953,340 | A | 9/1999 | Scott et al. |
| 5,964,832 | A * | 10/1999 | Kisor ................... 709/202 |
| 5,978,570 | A * | 11/1999 | Hillis ................... 711/200 |
| 5,991,808 | A * | 11/1999 | Broder et al. ......... 709/226 |
| 6,002,996 | A * | 12/1999 | Burks et al. ........... 702/188 |
| 6,005,860 | A * | 12/1999 | Anderson et al. ...... 370/352 |
| 6,012,101 | A | 1/2000 | Heller et al. |
| 6,016,464 | A | 1/2000 | Richardson |
| 6,021,495 | A | 2/2000 | Jain et al. |
| 6,026,394 | A * | 2/2000 | Tsuchida et al. ......... 707/3 |
| 6,052,380 | A | 4/2000 | Bell |
| 6,061,685 | A | 5/2000 | Fantenberg |
| 6,067,477 | A * | 5/2000 | Wewalaarachchi et al. ... 700/83 |
| 6,067,585 | A | 5/2000 | Hoang |
| 6,067,595 | A | 5/2000 | Lindenstruth |
| 6,098,091 | A * | 8/2000 | Kisor ................... 709/202 |
| 6,125,420 | A * | 9/2000 | Eidson ................. 710/242 |
| 6,148,379 | A * | 11/2000 | Schimmel .............. 711/152 |
| 6,173,207 | B1 * | 1/2001 | Eidson ................... 700/14 |
| 6,233,611 | B1 * | 5/2001 | Ludtke et al. .......... 709/223 |
| 6,261,103 | B1 * | 7/2001 | Stephens et al. ........ 434/276 |
| 6,269,391 | B1 | 7/2001 | Gillespie |
| 6,351,798 | B1 | 2/2002 | Aono |
| 6,405,337 | B1 * | 6/2002 | Grohn et al. ........... 714/749 |
| 6,421,676 | B1 * | 7/2002 | Krishnamurthy et al. ... 707/102 |
| 6,422,061 | B1 * | 7/2002 | Sunshine et al. ......... 73/29.01 |
| 6,871,211 | B2 * | 3/2005 | Labounty et al. ........ 709/203 |
| 2002/0019844 | A1 * | 2/2002 | Kurowski et al. ........ 709/201 |

FOREIGN PATENT DOCUMENTS

| | | |
|---|---|---|
| JP | 6348658 | 12/1994 |
| JP | 2593146 | 12/1996 |
| JP | 2889932 | 2/1999 |
| JP | 2000003341 | 1/2000 |

OTHER PUBLICATIONS

Mattias A. Blumrich, Kai Li, R. Alpert, Cezary Dubnicki, Edward W. Felten and J. Sandberg. "A Virtual Memory-mapped Network Interface for the SHRIMP Multicomputer", Apr. 1994, Proc. of the 21th Annual Int'l Symp. on Computer Architecture.*
PCT Search Report for WO 01/32528, International Application No. PCT/US 01/32528; International filing date Oct. 18, 2001.
"Towards a More Efficient Reflective Memory for the PC-Based DSM" by Milutinovic, et al., Published Dec. 17, 1995.
"Preliminary Study" by Networks and Distributed Systems, pp. 1-11 printed from webpage on Jun. 14, 2005.
Search Report Application No. 01274567.5 dated Oct. 4, 2006.

* cited by examiner

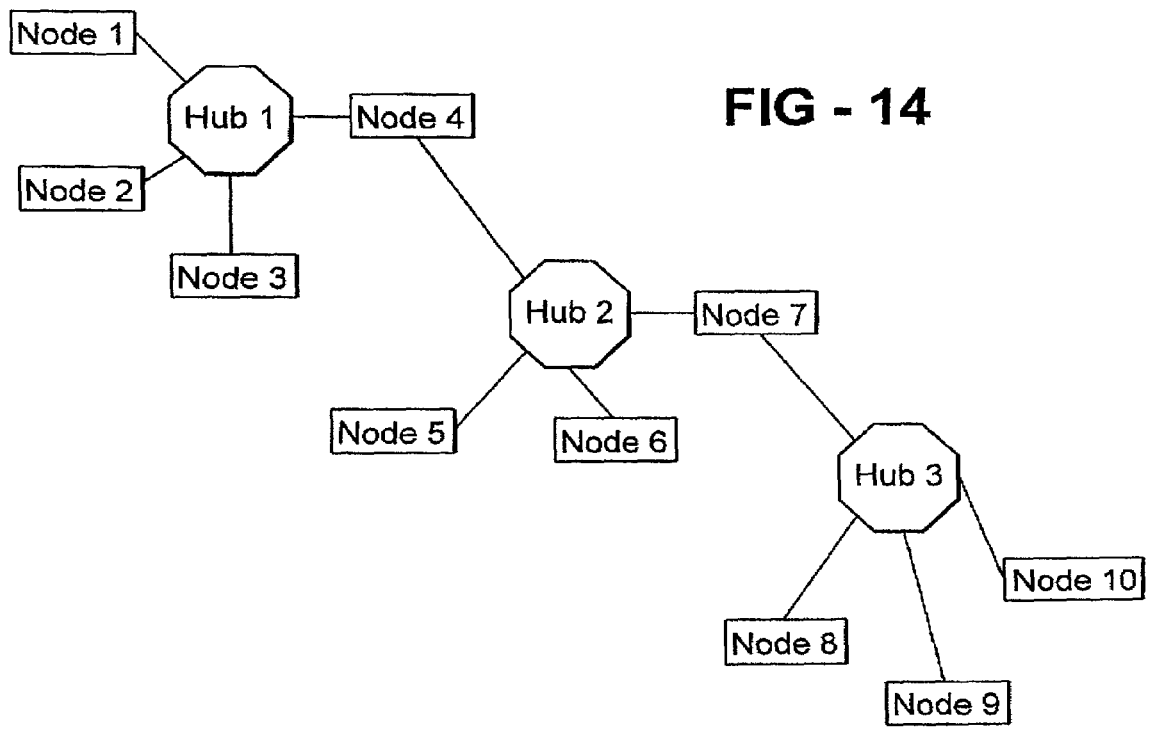
FIG - 14
FIG - 15
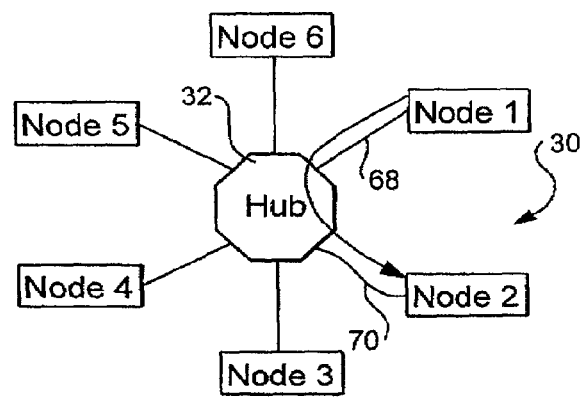

Second Memory Space (Node 2)

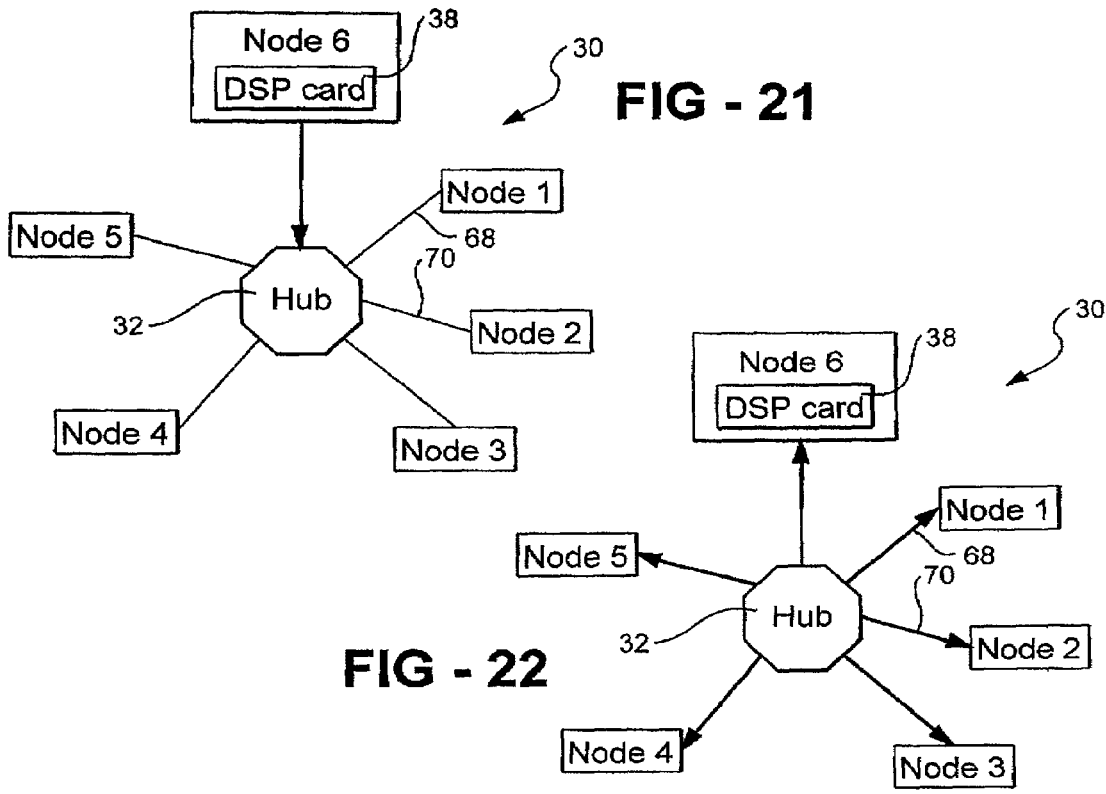
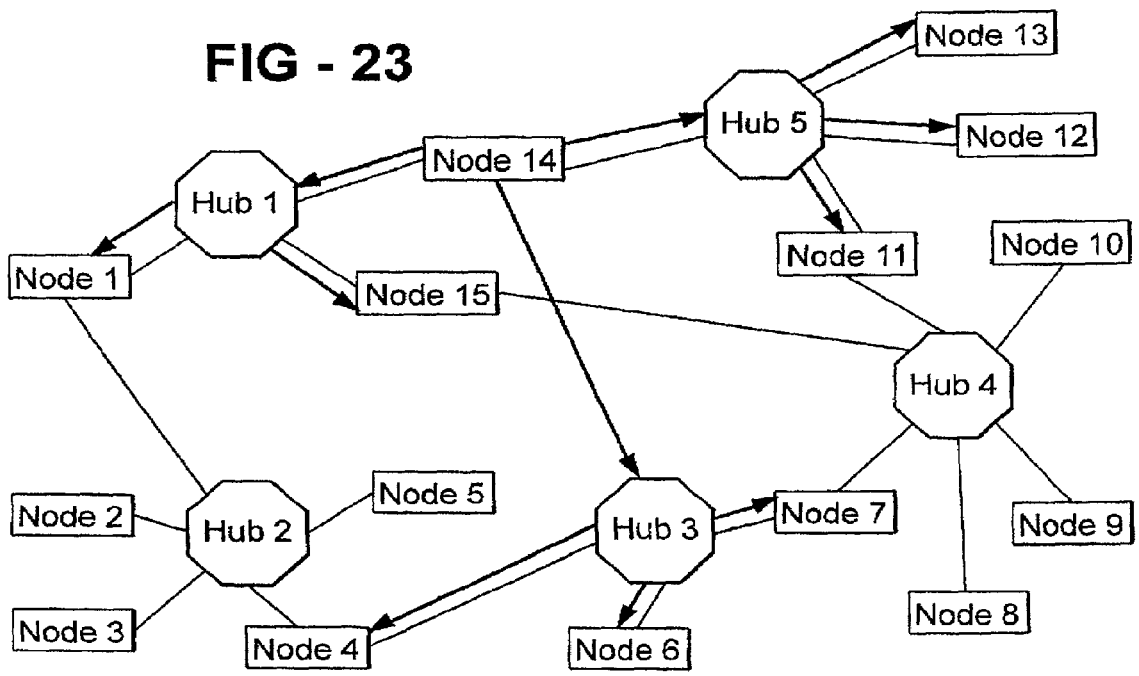

DISTRIBUTED MULTIPROCESSING SYSTEM

RELATED APPLICATION

This application claims priority to and all the benefits of U.S. Provisional Patent Application Ser. No. 60/241,233, filed on Oct. 18, 2000 and entitled "Distributed Multiprocessing System".

BACKGROUND OF THE INVENTION

1) Technical Field

The subject invention relates to a multiprocessing system which distributes data and processes between a number of processors.

2) Description of the Prior Art

Data processing and distribution is utilized in a number of different manufacturing and business related applications for accomplishing a virtually unlimited variety of tasks. The systems implemented to accomplish these tasks utilize different design configurations and are typically organized in a network fashion. Networks may be arranged in a variety of configurations such as a bus or linear topology, a star topology, ring topology, and the like. Within the network there are typically a plurality of nodes and communication links which interconnect each of the nodes. The nodes may be computers, terminals, workstations, actuators, data collectors, sensors, or the like. The nodes typically have a processor, a memory, and various other hardware and software components. The nodes communicate with each other over the communication links within the network to obtain and send information.

A primary deficiency in the prior art systems is in the manner in which nodes communicate with other nodes. Currently, a first node will send a signal to a second node requesting information. The second node is already processing information such that the first node must wait for a response. The second node will at some time recognize the request by the first node and access the desired information. The second node then sends a response signal to the first node with the attached information. The second node maintains a copy of the information which it may need for its own processing purposes. The second node may also send a verification to ensure that the information data was received by the first node.

This type of communication may be acceptable in a number of applications where the time lost between the communications of the first and second nodes is acceptable. However, in many applications, such as real time compilation of data during vehicle testing, this lag time is unacceptable. Further, the redundancy in saving the same data in both the second and first nodes wastes memory space and delays processing time. Finally, the two way communication between the first and second nodes creates additional delays and the potential for data collision.

Accordingly, it would be desirable to have a data processing system which did not suffer from the deficiencies outlined above, is virtually seamless during the processing of data while reducing or eliminating unnecessary redundancies.

SUMMARY OF THE INVENTION AND ADVANTAGES

The subject invention overcomes the deficiencies in the prior art by providing a distributed multiprocessing system comprising a first node and a second node with the nodes being separated from each other. A first processor is disposed within the first node for processing information and for assigning a first address to a first processed information. A first real memory location is disposed within the first node for storing processed information at the first node. A second processor is disposed within the second node and processes information and assigns a second address to a second processed information. A second real memory location is disposed within the second node for storing processed information at the second node. A central signal routing hub is interconnected between the first and second processors. An indexer is connected to the routing hub for indexing the first and second nodes to define different destination addresses for each of the nodes. A first communication link interconnects the first node and the hub for transmitting the first processed information between the first processor of the first node and the hub without storing the processed information within the first real memory location of the first node. A second communication link interconnects the second node and the hub for transmitting the second processed information between the second processor of the second node and the hub without storing the processed information within the second real memory location of the second node. The central routing hub includes a sorter for receiving at least one of the first and second processed information from at least one of the first and second nodes, thereby defining at least one sending node. The hub and sorter also associate a destination of at least one of the first and second addresses of the first and second processed information, respectively, with at least one of the destination addresses. Finally, the hub and sorter send at least one of the first and second processed information without modification from the hub over at least one of the communication links to at least one of the first and second nodes associated with the destination address, thereby defining at least one addressed node. The first and second real memory locations store processed information received from the hub.

The subject invention also includes a method of communicating across the distributed multiprocessing system having the first node with the first processor and the first real memory location. The system also has the second node with the second processor and the second real memory location. The method comprising the steps of; indexing the first and second nodes to define different destination addresses for each of the nodes; processing information within the first processor of the first node; addressing the processed information using at least one of the destination addresses; transmitting the processed information from the first processor of the first node across the first communication link toward the hub without storing the processed information in the first real memory location of the first node, thereby defining a sending node; receiving the processed information along with the destination address within the hub; identifying the destination address for the transmitted processed information within the hub; sending the processed information without modification from the hub over at least one of the communication links to at least one of the first and second nodes associated with the destination address, thereby defining at least one addressed node; and storing the processed information within the real memory location of the addressed node.

In addition, the unique configuration of the subject invention may be practiced without the hub. In particular, first and second real memory locations are connected to the first and second processors within the first and second nodes for storing received processed information. An indexer is provided for indexing the first and second nodes to define a different identifier for each of the nodes for differentiating the nodes. Further, the first and second nodes each include virtual memory maps of each identifier such that said first and second processors can address and forward processed information to each of the indexed nodes within the system.

The subject invention eliminating the hub also includes the steps of indexing the first and second nodes to define a different identifier for each of the nodes for differentiating the nodes; creating a virtual memory map of each of the identifiers within each of the first and second nodes such that the first and second processors can address and forward processed information to each of the indexed nodes within the system; and storing the processed information within the real memory location of the addressed node.

The subject invention therefore provides a data processing system which operates in a virtually instantaneous manner while reducing or eliminating unnecessary redundancies.

BRIEF DESCRIPTION OF THE DRAWINGS

Other advantages of the present invention will be readily appreciated as the same becomes better understood by reference to the following detailed description when considered in connection with the accompanying drawings wherein:

FIG. 14 is a schematic view of three multiprocessing systems each having a hub with the hubs interconnected by two common nodes;

FIG. 15 is a schematic view of the system of FIG. 1 illustrating another example of data flow between the nodes and the hub;

FIG. 21 is a schematic view of the system of FIG. 1 illustrating a incoming transmission from node 6;

FIG. 22 is a schematic view of the system of FIG. 20 illustrating a broadcast which sends outgoing transmissions to all nodes; and FIG. 23 is a schematic view of five systems interconnected by four common nodes illustrating a broadcast through the system.

DETAILED DESCRIPTION OF THE PREFERRED EMBODIMENT

Figure 1:
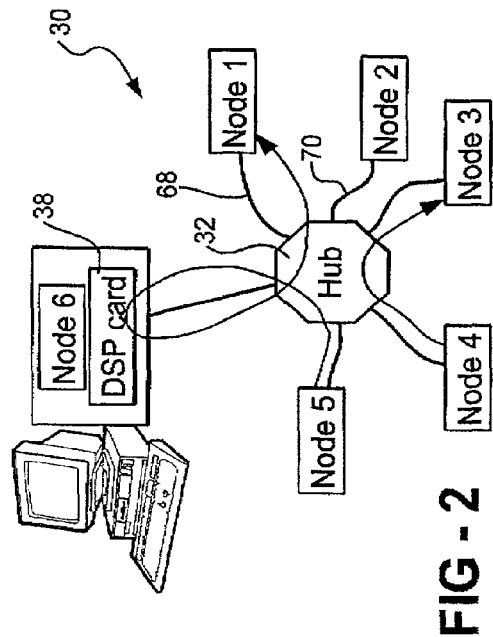
FIG. 1 is a schematic view of the distributed multiprocessing system utilizing six nodes interconnected to a single hub.

Referring to the Figures, wherein like numerals indicate like or corresponding parts throughout the several views, a distributed multiprocessing system is generally shown at 30 in FIG. 1. The system 30 comprises a plurality of modules or nodes 1-6 interconnected by a central signal routing hub 32 to preferably create a star topology configuration. As illustrated, there are six nodes 1-6 connected to the hub 32 with each of the nodes 1-6 being indexed with a particular code or identifier. As an example of an identifier, numerical indicators 1 through 6 are illustrated. As appreciated, any suitable alpha/numeric indicator may be used to differentiate one node from another. The shape, configuration, and orientation of the hub 32, which is shown as an octagon shape, is purely illustrative and may be altered to meet any desired need.

The nodes 1-6 may be part of a workstation or may be the workstation itself. Illustrative of the versatility of the nodes 1-6, node 6 is part of a host computer 34, nodes 1, 2, 4, and 5 are connected to actuators 36 and node 3 is unconnected. It should be appreciated that the nodes 1-6 can be connected to any type of peripheral device or devices including multiple computers, actuators, hand held devices, and the like. For example, node 6 is shown also connected to a hand held device 35. Alternatively, none of the nodes 1-6 could be connected to a peripheral device which would create a completely virtual system.

Figure 2:
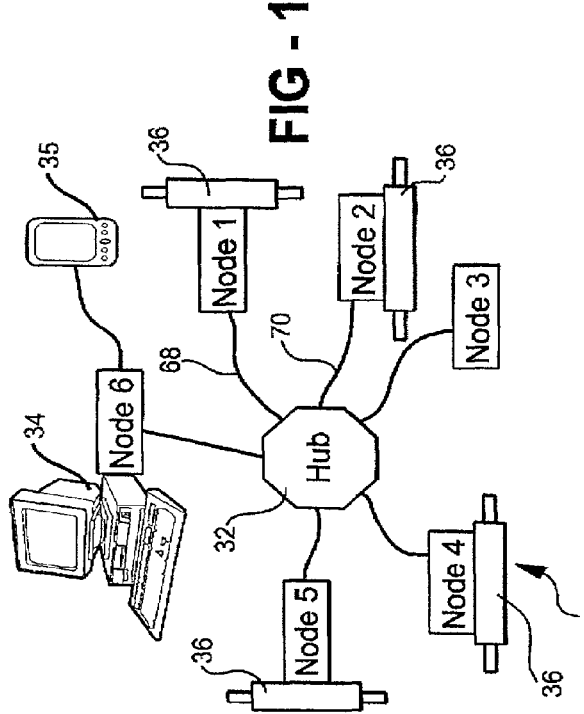
FIG. 2 is another view of the system of FIG. 1 illustrating possible paths of data flow between the nodes and the hub.

Referring also to FIG. 2, the host computer 34 has a digital signal processing card 38 and preferably at least one peripheral device. The peripheral devices may be any suitable device as is known in the computer art such as a monitor, a printer, a key board, a mouse, etc. As illustrated in FIG. 2 and discussed in greater detail below, the nodes 1-6 preferably communicate with each other through the hub 32. For example, node 5 is shown communicating with node 6 through the hub 32 which in turn communicates with node 1 through the hub 32. Also, node 4 is shown communicating with node 3 through the hub 32. As discussed in greater detail below with respect to an alternative embodiment, when there are only two nodes 1, 2 the hub 32 can be eliminated such that the nodes 1, 2 communicate directly with each other.

The subject invention is extremely versatile in the number of nodes which can be connected to the hub 32. There may be ten, one hundred, or thousands of nodes connected to the hub 32 or only a pair of nodes or even a single node connected to the hub 32. As will be discussed in greater detail below, the nodes 1-6 can operate independently of each other.

In the preferred embodiment, the nodes 1-6 of the subject invention are utilized to compile data by capturing a signal having an instantaneous value. The signal is considered to have the value as sampled at whatever moment in time the sampling occurs, i.e., an instantaneous value. In addition, the signal contains no other information other than the instantaneous value. The preferred embodiment compiles a plurality of instantaneous measured values (data) during a testing of a vehicle. In particular, during servo-hydraulic testing of a vehicle on a testing platform. Of course, the subject invention is in no way limited to this envisioned application. The distributed multiprocessing system 30 of the subject invention can be used in virtually any industry to perform virtually any type of computer calculation or processing of data.

Referring to FIGS. 3 through 7, nodes 1 and 2 and the hub 32 are shown in greater detail. Each of the nodes 1-6 are virtually identical. Accordingly, nodes 3 through 6 can be analogized as having substantially identical features illustrated in the detail of nodes 1 and 2. Each of the nodes 1-6 include a processor and a number of other components which will be outlined individually below.

The processors may be of different sizes and speeds. The size and speed of the processor may be varied to satisfy a multitude of design criteria. Typically, the processor will only be of a size and speed to support the tasks or operation which are associated with the node 1-6. Further, the processors can be of different types which recognize different computer formats and languages.

Nodes 1 and 2 will now be discussed in greater detail. The first node, node 1, includes a first processor 40 and the second node, node 2, includes a second processor 42. The first 40 and second 42 processors are indexed in concert with nodes 1 and 2 to define a different identifier for each of the processors 40, 42 for differentiating the processors 40, 42 in the same fashion as the nodes 1-6 are differentiated. In particular, an indexer 73, which is discussed in greater detail below, is included for indexing the first 40 and second 42 processors to define the different identifier for each of the processors 40, 42 for differentiating the processors 40, 42 and the nodes 1-6.

The first processor 40 processes information at a first station, i.e., node 1's location, and assigns a first address to a first processed information. Specifically, the first processor 40 captures the signal having the instantaneous value and assigns the first address to the captured instantaneous value to define a first instantaneous value. Similarly, a second processor 42 processes information at a second station, i.e., node 2's location, and assigns a second address to a second processed information. Specifically, the second processor 42 captures the signal having the instantaneous value and assigns the second address to the captured instantaneous value to define a second instantaneous value. As should be appreciated, the addresses are indexed to correlate to the indexing of the processors 40, 42 and the nodes 1-6.

First and second actuators 36 are connected to the first 40 and second 42 processors, respectively, for performing the testing operation during an operation of the system 30. There are additional components included within each of the nodes 1-6 such as a chipset 44 which interconnects the hub 32 and the processors 40, 42 and a buffer 46 disposed between each of the processors 40, 42 and the chipsets 44. Chipsets 44 were chosen for their transparent handling of data streams.

Figure 5:
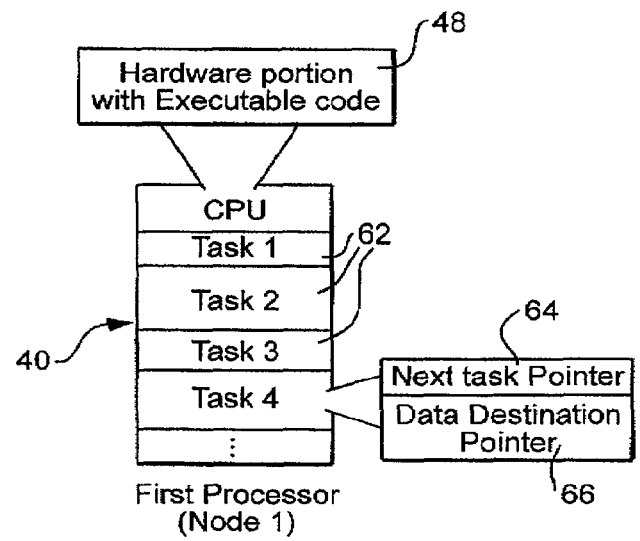
FIG. 5 is a detailed schematic view of a processor for node 1.
Figure 7:
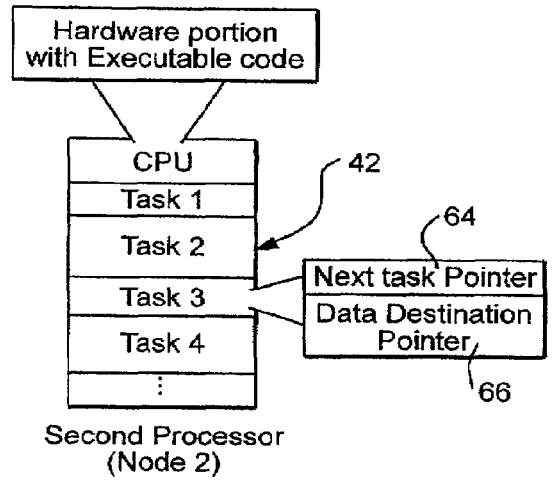
FIG. 7 is a detailed schematic view of a processor for node 2.

As shown in FIGS. 5 and 7, the first 40 and second 42 processors further include a hardware portion 48 for assigning the first and second addresses to the first and second processed information (first and second instantaneous values), respectively. In particular, the hardware portion 48 assigns a destination address onto the processed information corresponding to the identifier of an addressed node 1, 2. The hardware portion 48 also conforms or rearranges the data or information to an appropriate format. As discussed above, the processors 40, 42 can be of different types which recognize different computer formats. Hence, the hardware portion 48 ensures that the proper format is sent to the addressed node 1, 2. However, the addresses are preferably of a common format such that the hub 32 commonly recognizes these signals. Examples of the processors 40, 42 operation are discussed below in greater detail.

Figure 4:
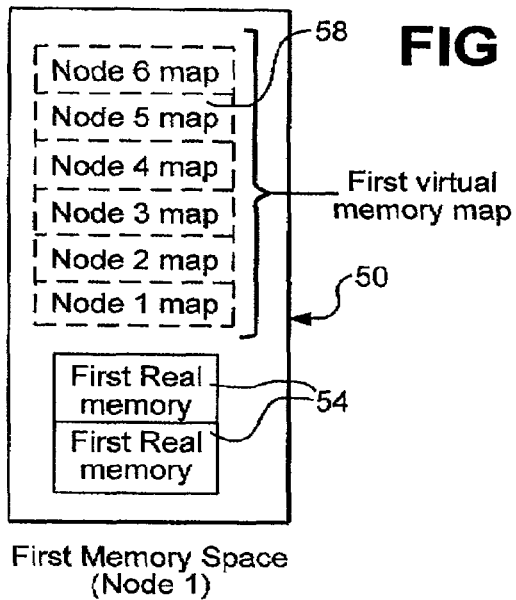
FIG. 4 is a detailed schematic view of a memory space for node 1.
Figure 6:
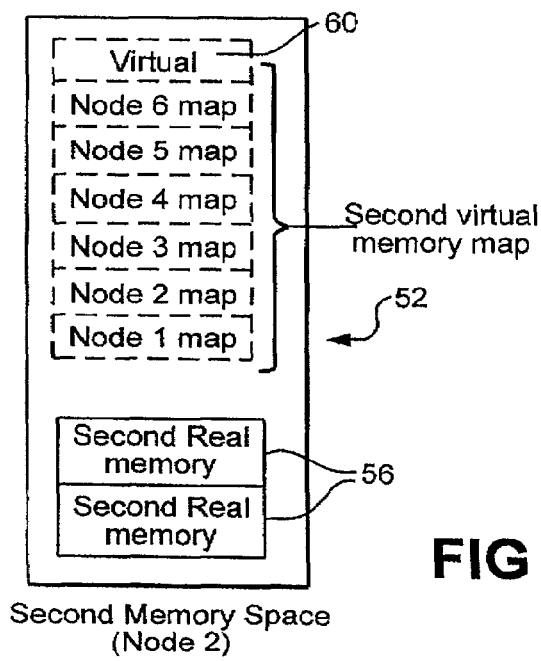
FIG. 6 is a detailed schematic view of a memory space for node 2.

A first memory space 50 is connected to the first processor 40 and a second memory space 52 is connected to the second processor 42. As shown in FIGS. 4 and 6, the first 50 and second 52 memory spaces are shown in greater detail, respectively. A first real memory location 54 is disposed within the first memory space 50 and is connected to the hardware portion 48 of the first processor 40. Similarly, a second real memory location 56 is disposed within the second memory space 52 and is connected to the hardware portion 48 of the second processor 42. During operation, the hardware portion 48 assigns a memory address onto the processed information corresponding to the memory location of an addressed node 1, 2. The first 54 and second 56 real memory locations can therefore store received processed information, which is also discussed in greater detail below. The first 40 and second 42 processors are not capable of reading the real memory of another processor. In other words, the processors of a particular node 1-6 can read its own real memory within its own real memory locations but cannot read the real memory stored within a real memory location of another processor.

The first 54 and second 56 real memory locations may also have categorized message areas (not shown) such that multiple data inputs will not be overwritten. The categorized message areas could correlate to the memory addresses. In a similar fashion as above with regards to the processors 40, 42, the first 54 and second 56 real memory locations are of a size commensurate with the needs of the associated node 1-6.

Also illustrated within the first 50 and second 52 memory spaces at FIGS. 4 and 6, are first 58 and second 60 virtual memory maps. The first 50 and second 52 memory spaces each include virtual memory maps 58, 60 of each identifier for each node 1-6 such that the first 40 and second 42 processors can address and forward processed information to each of the indexed nodes 1-6 within the system 30. The virtual memory maps 58, 60 are essentially a means for the processors 40, 42 to be able to address each other processor or node 1-6 within the system 30. The operation and specifics of the virtual memory maps 58, 60 will be discussed in greater detail below.

Referring back to FIGS. 5 and 7, each of the first 40 and second 42 processors further include at least one task 62. Each of the first 40 and second 42 processors will typically include a plurality of tasks 62 which can be performed in any order. A task 62 is a generic term for a specific operation or function being performed by a processor. The processors 40, 42 will include executable code for performing the tasks 62 which may be of different complexities. No one process or output associated with a task 62 is unique to any one node 1-6. In fact, many nodes 1-6 may have the same task 62 or tasks 62 for producing similar data.

As illustrated in the first processor 40 of node 1, there are four tasks 62 each occupying a different amount of space. A larger task space is meant to represent a task 62 which takes longer to process. The task 62 may be any suitable type of calculation, data collection, classification, or any other desired operation.

As also shown in FIGS. 5 and 7, each task 62 includes at least a pair of pointers 64, 66 for directing a flow of data or values from a sending node 1, 2 to a destination node 1, 2. The pointers 64, 66 are illustrated as branching off of the fourth task 62 in FIG. 5 and the third task 62 in FIG. 7. As should be appreciated, there are pointers 64, 66 associated with each of the tasks 62 such that there is a continuous stream of information. The pointers 64, 66 includes a next task pointer 64 for directing the sending node 1, 2 to a subsequent task 62 to be performed, and at least one data destination pointer 66 for directing the sending node 1, 2 to forward the processed information (instantaneous values) to the hub 32. Preferably, there is only one next task pointer 64 such that there is a clear order of operation for the processors 40, 42. Conversely, there may be any number of data destination pointers 66 such that the sending node 1, 2 may simultaneously forward processed information to a multitude of addressed nodes 1-6. Further, each of the processed information sent to the multitude of addressed nodes 1-6 may be different.

The next task 64 and data destination 66 pointers do not necessarily have to be operational for each task 62. For example, there may not be a need to send the particular information that the fourth task 62 has performed such that the data destination pointer 66 will not be operational. Conversely, the fourth task 62 may be the final task to be performed such that the next task pointer 64 will not be operational. Typically, at least one of the pointers 64, 66 will be operational such that, at a minimum, the information will be sent to the hub 32 or a subsequent task 62 will be performed.

Figure 3:
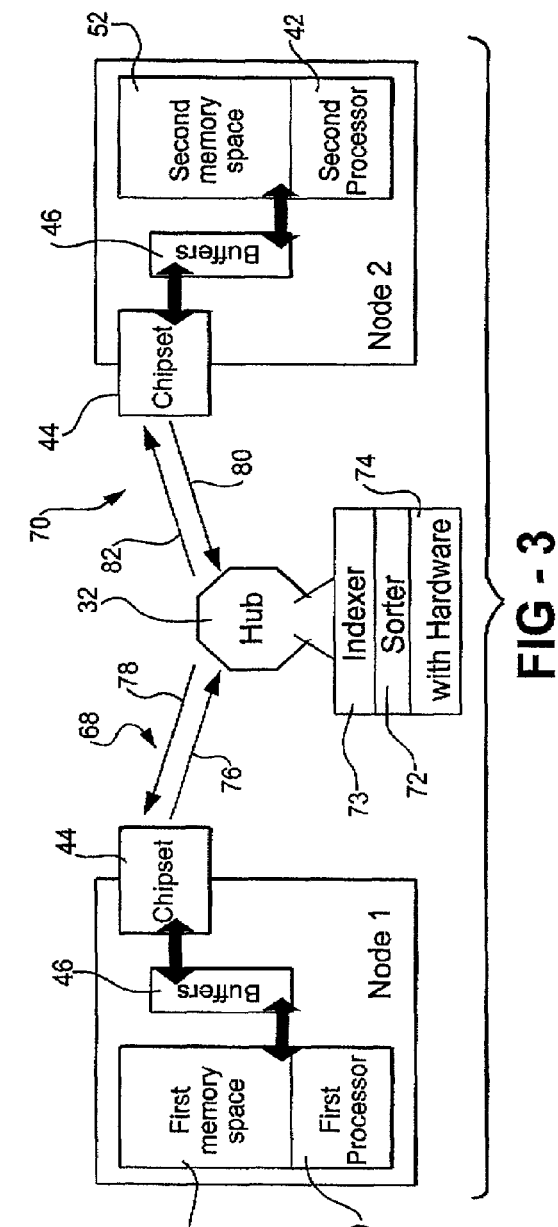
FIG. 3 is a detailed schematic view of node 1 and node 2 as connected to the hub.

As shown back in FIGS. 1, 2, and 3, a first communication link 68 interconnects the first processor 40 of node 1 and the hub 32 for transmitting the first processed information, such as the first instantaneous value, between the first processor 40 and the hub 32. Similarly, a second communication link 70 interconnects the second processor 42 of node 2 and the hub 32 for transmitting the second processed information, such as the second instantaneous value, between the second processor 42 and the hub 32. As appreciated, the hub 32 is capable of receiving processed information (instantaneous values) from all of the nodes 1-6 simultaneously and then forwarding the processed information to the correct destinations.

There are also communication links (not numbered) interconnecting each of the remaining processors of the remaining nodes 3-6 to the hub 32. As can be appreciated, the number of communication links is directly dependent upon the number of processors and nodes 1-6.

As discussed above, an indexer 73 is provided for indexing or organizing the first 40 and second 42 processors to define the different identifiers for each of the processors 40, 42, which differentiates the processors 40, 42 and the nodes 1-6. Preferably, the indexer 73 is disposed within the hub 32. Hence, when the nodes 1-6 are initially connected to the hub 32, the indexer 73 within the hub 32 begins to organize the nodes 1-6 in a particular order. This is how the entire organization of the system 30 begins. The hub 32 and indexer 73 also create the mapping within the memory spaces 50, 52 as part of this organization. As discussed above the mapping includes the first 58 and second 60 virtual memory maps of the nodes 1, 2. The virtual memory maps 58, 60 outline each identifier for each node 1-6 such that the processors can address and forward processed information to each of the indexed nodes 1-6 within the system 30.

As shown in FIG. 3, the central routing hub 32 includes a sorter 72 for receiving at least one of the first and second processed information (first and second instantaneous value) from at least one of the first 40 and second 42 processors. By receiving the processed information, at least one sending node 1-6 is defined. Each of the first 40 and second 42 processors of the nodes 1, 2 may send processed information or only one of the first 40 and second 42 processors of the nodes 1, 2 may send processed information. In any event, at least one of the nodes 1-6 will be deemed as a sending node 1-6.

The hub 32 and sorter 72 also identify a destination of at least one of the first and second addresses of the first and second processed information (first and second instantaneous value), respectively to define the destination address. Finally, the hub 32 and sorter 72 send at least one of the first and second processed information without modification from the hub over at least one of the communication links 68, 70 to at least one of the nodes 1, 2. The node 1, 2 to which the information is being sent defines at least one addressed node 1, 2. The sorter 72 includes hardware 74 for determining the destination addresses of the addressed nodes 1-6.

As also shown in FIG. 3, the first communication link 68 preferably includes first incoming 76 and first outgoing 78 transmission lines. Similarly, the second communication link 70 preferably includes second incoming 80 and second outgoing 82 transmission lines. The first 76 and second 80 incoming transmission lines interconnect the first 40 and second 42 processors, respectively, to the hub 32 for transmitting signals in only one direction from the first 40 and second 42 processors to the hub 32 to define a send-only system 30. Similarly, the first 78 and second 82 outgoing transmission lines interconnect the first 40 and second 42 processors, respectively, to the hub 32 for transmitting signals in only one direction from the hub 32 to the first 40 and second 42 processors to further define the send-only system 30. The chipsets 44 are designed to interconnect each of the incoming 76, 80 and outgoing 78, 82 transmission lines and the corresponding processors 40, 42 for creating a virtually transparent connection therebetween.

As will be discussed in greater detail below, the send-only system 30 eliminates the duplication of stored data or values. Preferably, the first 76 and second 80 incoming transmission lines and the first 78 and second 82 outgoing transmission lines are unidirectional optical fiber links. The optical fiber links are particularly advantageous in that the information is passed under high speeds and becomes substantially generic. Further, the unidirectional optical fiber links prevent the possibility of data collision. As appreciated, the first 76 and second 80 incoming and the first 78 and second 82 outgoing transmission lines may be of any suitable design without deviating from the scope of the subject invention.

The distributed multiprocessing system 30 can include any number of additional features for assisting in the uninterrupted flow of data (values) through the system 30. For example, a counter may be included to determine, control, and limit a number of times processed information is sent from a sending node to an addressed node 1-6. A sequencer may also be included to monitor and control a testing operation as performed by the system 30. In particular, the sequencer may be used to start the testing, perform the test, react appropriately to limits and events, establish that the test is complete, and switch off the test.

Figure 8:
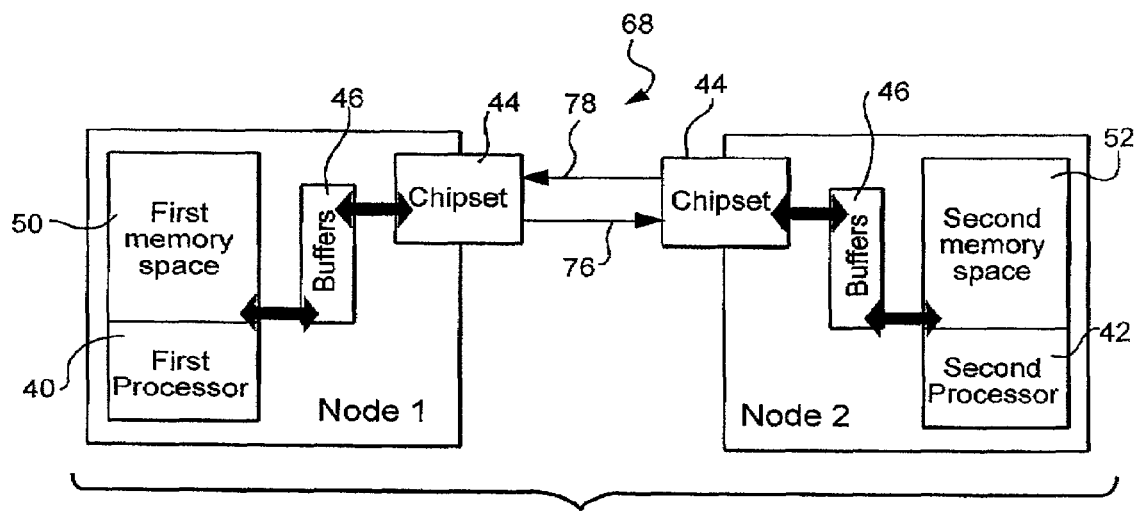
FIG. 8 is an alternative embodiment illustrating only two nodes without a hub.

Referring to FIG. 8, an alternative embodiment of the system 30 is shown wherein there are only two nodes 1, 2 and the hub 32 is eliminated. In this embodiment, a single communication link 68 interconnects the first processor 40 with the second processor 42 for transmitting the first and second processed information between the first 40 and second 42 processors of the nodes 1, 2. An indexer (not shown in this Figure) indexes the first 40 and second 42 processors to define a different identifier for each of the processors 40, 42 and nodes 1, 2 in a similar manner as above. The first 50 and second 52 memory spaces also each include virtual memory maps of each identifier such that the nodes 1, 2 can address and forward processed information to each other. There are also first 54 and second 56 real memory locations for storing received processed information. The unique architecture allows the two nods 1, 2 to communicate in a virtually seamless manner.

Specifically, the method of communicating between the nodes 1, 2 and the first 40 and second 42 processors includes the steps of initially indexing the nodes 1, 2 to differentiate the nodes 1, 2. Then the virtual memory maps of each of the identifiers is created within each of the first 50 and second 52 memory spaces such that the first 40 and second 42 processors can address and forward processed information to each other. The processed information is transmitted by utilizing the virtual memory map of the sending node 1, 2, which may be from either node 1, 2, from the sending node 1, 2 across the communication link toward the addressed node 1, 2, which is the corresponding opposite node 1, 2. The processed information is then received along with the address in the addressed node 1, 2 and the processed information is stored within the real memory location of the addressed node 1, 2.

The remaining aspects of the nodes 1, 2 of this embodiment are virtually identical to the nodes 1, 2 of the primary embodiment. It should be appreciated that the details of the first 40 and second 42 processors as set forth in FIGS. 5 and 7, and the details of the first 50 and second 52 memory spaces as set forth in FIGS. 4 and 6 apply to this alternative embodiment.

Figure 9:
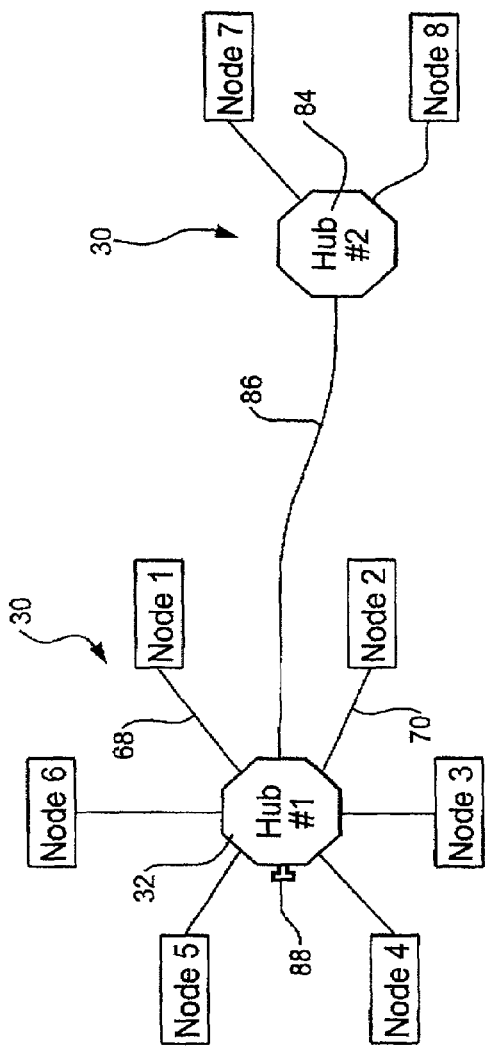
FIG. 9 is a schematic view of two multiprocessing systems each having a hub with the hubs interconnected by a hub link.
Figure 10:
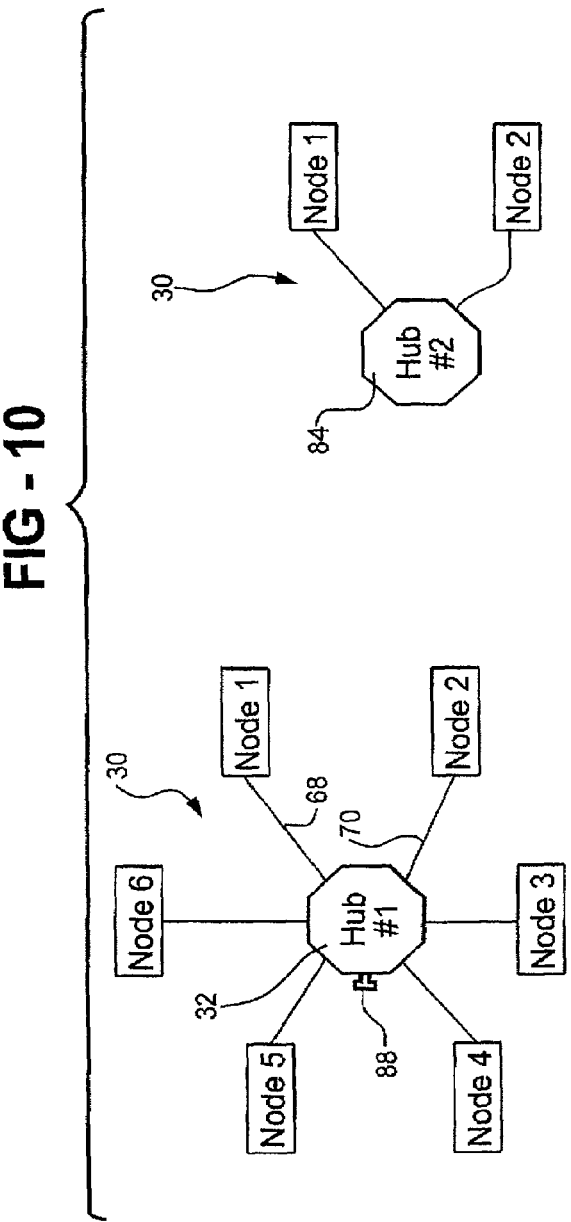
FIG. 10 is a schematic view of the two multiprocessing systems of FIG. 8 before the hubs are interconnected.

Referring to FIG. 9, a second hub 84, having nodes 7 and 8 with seventh and eighth processors, is interconnected to the first hub 32 by a hub link 86. The connection of one hub to another is known as cascading. As illustrated in FIG. 10, the second hub 84, before connected to the first hub 32, indexed the two nodes 7 and 8 as node 1 and node 2. As should be appreciated, the nodes 1-8 of the two hubs 32, 84 must be re-indexed such that there are not two node 1s and node 2s.

Specifically, the indexer first indexes the first 32 and second 84 hubs to define a master hub 32 and secondary hub 84. In the illustrated example, hub number 1 is the master hub 32 and hub number 2 is the secondary hub 84. A key 88 is disposed within one of the first 32 and second 84 hubs to determine which of the hubs 32, 84 will be defined as the master hub. As illustrated, the key 88 is within the first hub 32. The indexer also indexes the nodes 1-8 and processors to redefine the identifiers for each of the nodes 1-8 for differentiating the processors and nodes 1-8. When the first or master hub 32 is connected to the second or secondary hub 84 the entire virtual memory maps of each node 1-8 connected to the first hub 32 is effectively inserted into the virtual memory maps of each node 1-8 connected to the second hub 84 and vise versa. Hence, each hub 32, 84 can write to all of the nodes 1-8 in the new combined or cascaded system 30 as shown in FIG. 9.

Figure 11:
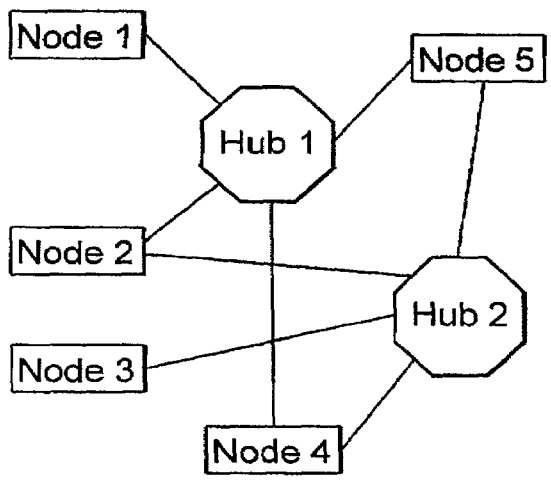
FIG. 11 is a schematic view of two multiprocessing systems each having a hub with the hubs interconnected by a common node.
Figure 12:
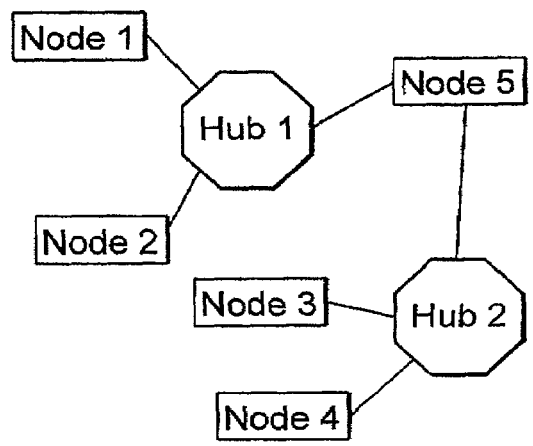
FIG. 12 is another schematic view of two multiprocessing systems interconnected by a common node.
Figure 13:
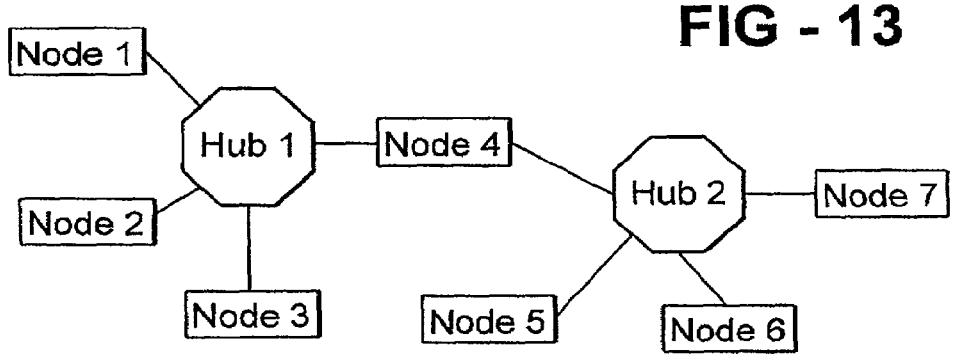
FIG. 13 is yet another schematic view of two multiprocessing systems interconnected by a common node.

Referring to FIGS. 11 through 13, there is illustrated various configurations for the combining of two hubs each having a plurality of nodes. These examples illustrate that the hubs can be attached through a node as opposed to utilizing the hub link 86. Further, as shown in FIG. 11, a node may be connected to more than one hub and the hubs may be connected to more than one common node.

Referring to FIG. 14, there may be a third or more hubs interconnected to the system 30 through either a node (as shown) or by hub links 86. As can be appreciated, the versatility of the subject system 30 with regards to various combinations and configurations of nodes and hubs is virtually limitless.

The particular method or steps of operation for communicating across the distributed multiprocessing system 30 is now discussed in greater detail. As above, the method will be further detailed with regards to communication between node 1 and node 2. In particular, as illustrated in FIG. 15, the given example is node 1 communicating to node 2. It should be appreciated that the steps of operation will be substantially identical when communicating between any of the nodes 1-6 of the system 30 in any direction. Further, the nodes 1-6 can communicate directly with themselves as is discussed in another example below. In fact, a node 1-6 sending information to the hub 32 does not know the difference between writing to its own real memory location or the real memory location of another node 1-6.

Referring to FIG. 16, node 1 is shown again in greater detail. The method comprises the steps of processing information within at least one of the first 40 and second 42 processors for capturing a signal having an instantaneous value. In this example the information is processed within the first processor 40 by proceeding through a number of tasks 62 in node 1. As discussed above, the tasks 62 may be any suitable type of calculation, compilation or the like. Preferably, the processing of the information is further defined as compiling a plurality of instantaneous measured values (data) within the first processor 40. During the testing of the vehicle, which is discussed only as an illustrative embodiment, many of the processors of the nodes 1-6, including in this example node 1, will obtain and compile testing data in the form of instantaneous measured values.

To maintain the continuous flow of information, the system 30 further includes the step of directing the sending node 1-6, which in this example is the first processor 40 of node 1, to a subsequent task 62 to be performed within the first processor 40 while simultaneously sending the processed information across one of the communication links 68, 70 to the hub 32. This step is accomplished by the use of the tasks 62 and pointers 64, 66. As shown, the first task 62 is first completed and then the first processor 40 proceeds to the second task 62. The pointers 64, 66 within the first task 62 direct the flow of the first processor 40 to the second task 62. Specifically, the data destination pointer 66 is silent and the next task pointer 64 indicates that the second task 62 should be the next task to be completed. The second task 62 is then completed and the first processor 40 proceeds to the fourth task 62. In this step, the next task pointer 64 of the second task 62 indicates to the first processor 40 that the fourth task 62 should be next, thereby skipping over the third task 62. The fourth task 62 is completed and the next task pointer 64 directs the flow to another task 62. The data destination pointer 66 of the fourth task 62 indicates that the information as processed after the fourth task 62 should be sent to the hub 32. The flow of information from the first task 62 to the second task 62 to the fourth task 62 is purely illustrative and is in now way intended to limit the subject application.

The processed information (values) from the fourth task 62 is then addressed and transmitted from the first processor 40 across at least one of the communication links 68, 70 toward the hub 32. As discussed above, the communication links 68, 70 are preferably unidirectional. Hence, the step of transmitting the processed information is further defined as transmitting the processed information across the first incoming transmission line 76 in only one direction from the first processor 40 to the hub 32 to define a send-only system 30. The transmitting of the processed information is also further defined by transmitting the data (instantaneous values) along with executable code from the sending node 1-6 to the addressed node 1-6. As appreciated, the first 40 and second 42 processors initially do not have any processing capabilities. Hence, the executable code for the processors 40, 42 is preferably sent to the processors 40, 42 over the same system 30. Typically, the executable code will include a command to instruct the processors 40, 42 to process the forwarded data (values) in a certain fashion. It should also be noted that the transmitting of the processed information may be a command to rearrange or reorganize the pointers of the processor of the addressed node 1-6. This in turn may change the order of the tasks which changes the processing of this processor. As appreciated, the transmitted processed data may include any combination of all or other like features.

The processed information is preferably addressed by the data destination pointer 66 directing the flow to the first virtual memory map 58 of node 1 and pointing to a destination node. The step of addressing the processed information is further defined as assigning a destination address onto the processed information corresponding to an identifier of an addressed node 1-6. The step of addressing the processed information is further defined as assigning a memory address onto the processed information corresponding to the memory location of the addressed node 1-6, i.e., node 2. In this example the destination node, destination address, and memory address will be node 2 while the originating node will be node 1.

Figure 16:
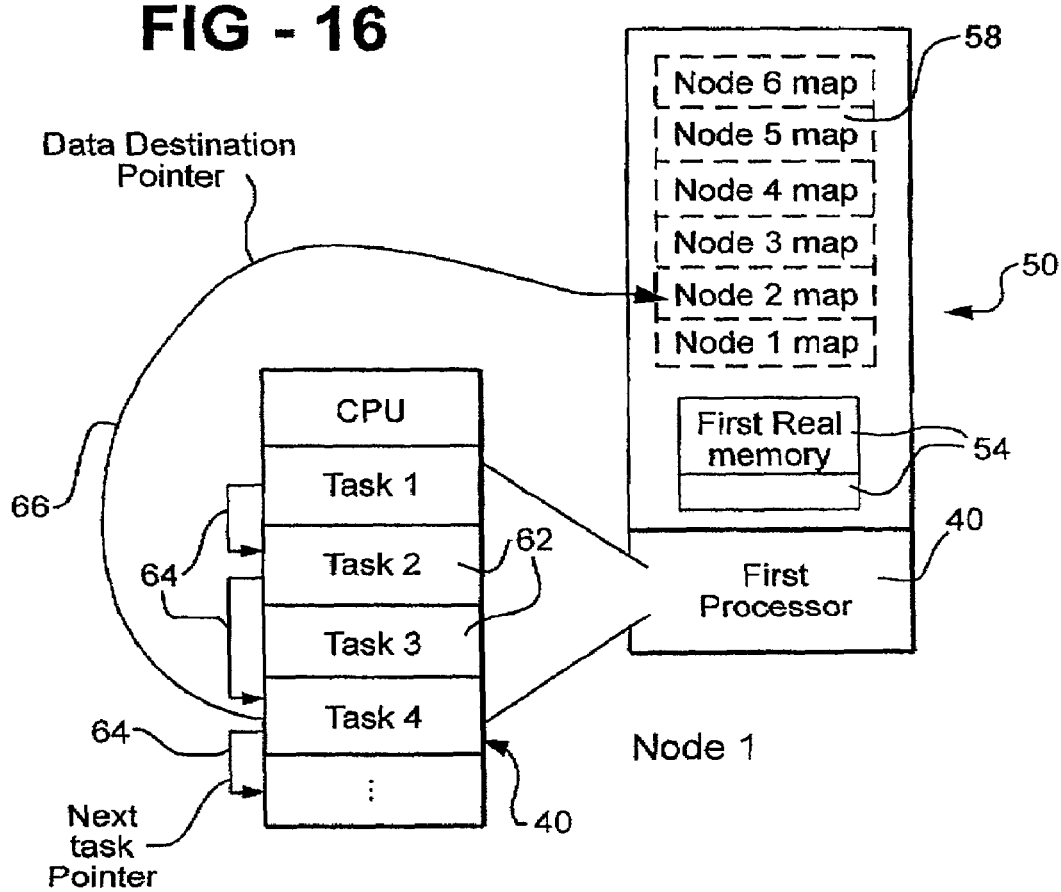
FIG. 16 is a detailed schematic view of the processor and memory space of node 1 as node 1 processes information.

The virtual memory map 58, 60 of each of the identifiers is created within each of the nodes 1, 2 such that the first 40 and second 42 processors can address and forward processed information to each of the indexed nodes 1, 2 within the system 30. As discussed above, the virtual memory map 58, 60 is a means to which the processor can recognize and address each of the other processors in the system 30. By activating the data destination pointer 66 to direct a sending node 1, 2 to send information to the hub 32, node 1 is then defined as the sending node 1. As shown in FIG. 16, the data destination pointer 66 directs the processed information to node 2 in the first virtual memory map 58 such that the destination address of node 2 will be assigned to this information.

Figure 17:
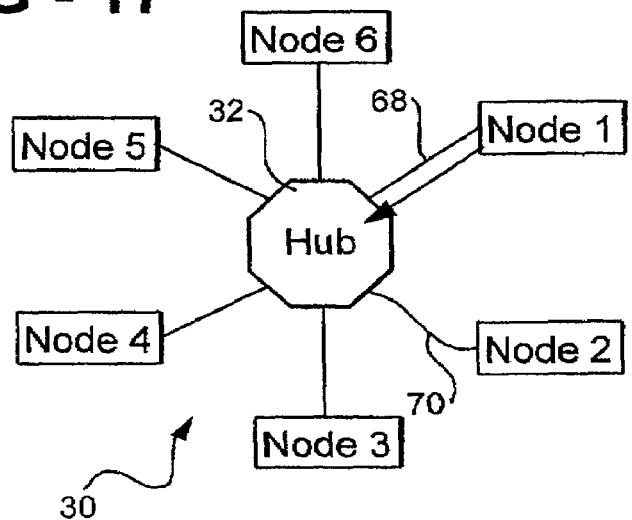
FIG. 17 is a schematic view of the system of FIG. 14 illustrating an incoming transmission of information.

Referring to FIG. 17, the processed information is sent across the first incoming transmission line 76 of the first communication link 68. The processed information, along with the addresses, is then received within the hub 32.

Figure 18:
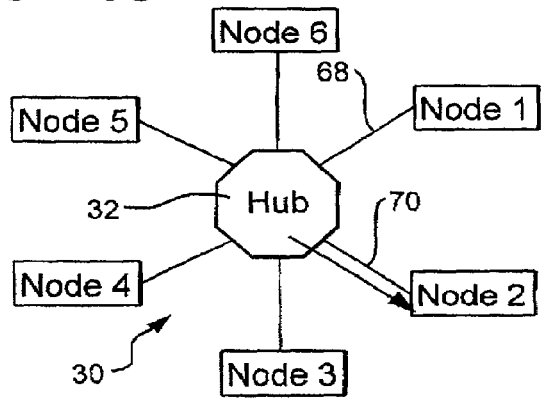
FIG. 18 is a schematic view of the system of FIG. 14 illustrating an outgoing transmission of information.

Referring to FIG. 18, the destination of the address for the transmitted processed information is identified within the hub 32 and the processed information is sent without modification over the second communication link 70 to, in this example, the second processor 42 of node 2. The step of sending the processed information without modification is further defined as sending the processed information over the second outgoing transmission line 82 in only one direction from the hub 32 to the second processor 42 to further define the send-only system 30. In this example, the hub 32 determines that the destination of the address is for node 2 which defines node 2 as an addressed node with the destination address.

Figure 19:
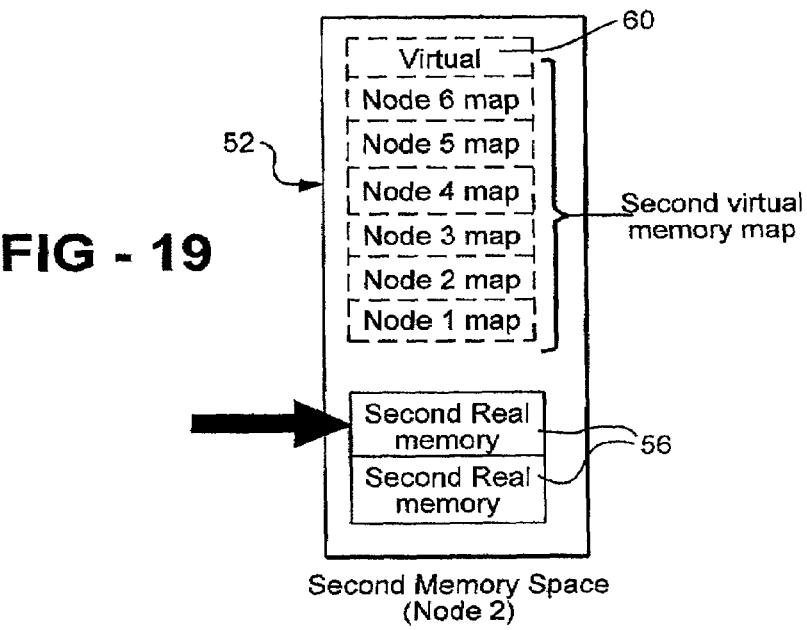
FIG. 19 is a schematic view of the memory space of node 2 as the processed information of node 1 is stored into a real memory location of node 2.

As shown in FIG. 19, the processed information (instantaneous value) is then stored within the second real memory location 56 of the addressed node 2 wherein the second processor 42 can utilize the information (value) as needed. The processed information may be stored within the categorized message areas or locations of the second real memory location 56 in accordance with the associated memory address. The destination address (of node 2) may be stripped from sent processed information before the information is stored in the second real memory location 56.

As also discussed above, the method of operation for the subject invention eliminates unnecessary duplication of information. When node 1 sends the processed information to the hub 32, which then travels to node 2, the information, which can include data, such as the instantaneous value, executable code, or both, is not saved at node 1 and is only stored at node 2. Node 2 does not send a confirmation and node 1 does not request a confirmation. Node 1 assumes that the information arrived at node 2. The subject system 30 is used to transport data (values) to desired real memory locations where the data (value) can be used during subsequent processing or evaluation.

The flow of communication across the system 30 will be precisely controlled such that the nodes 1-6, i.e., node 2, will not receive unnecessary or processed information until it is needed. In other words, the processing at node 1 and the data destination pointer 66 at node 1 will be precisely timed to send the processed information across the system 30 to node 2 only moments before node 2 requires this information. Typically, node 2 will require the processed information of node 1 during its own processing of tasks. The system 30 of the subject invention is therefore virtually seamless and does not suffer from the deficiencies of requesting information from other nodes.

Figure 20:
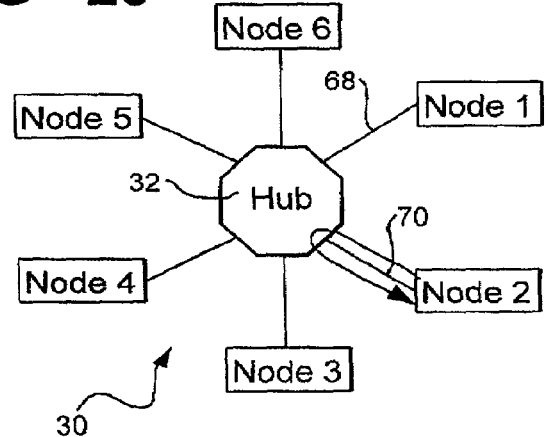
FIG. 20 is a schematic view of the system of FIG. 1 illustrating yet another example of data flow between a node and the hub.

Another example of communicating across the subject system 30 is illustrated in FIG. 20 wherein node 2 communicates with itself. The information is processed within the second processor 42 of node 2 by proceeding through a number of tasks 62. The processed information is then addressed and transmitted from the second processor 42 across the second incoming transmission line 80 toward the hub 32. The processed information is addressed by the data destination pointer 66 directing the flow to the second virtual memory map 60 and pointing to the destination node. A destination address and a memory address are then assigned to the information. In this example the destination node, destination address, and memory address will be node 2 while the originating node will also be node 2. By activating the data destination pointer 66 to direct a sending node 1-6 to send information to the hub 32, node 2 is defined as the sending node 2. The processed information, along with the address, is then received within the hub 32. The destination of the address for the transmitted processed information is identified within the hub 32 and the processed information is sent without modification from the hub over the second outgoing transmission line 82 to the designated node 1-6. In this example, the hub 32 determines that the destination of the address is for node 2 which defines node 2 as an addressed node 2 with the destination address. The processed information is sent across the second outgoing transmission line 82 back to the second processor 42 within node 2. The processed information is then stored within the second real memory location 56 of the addressed node 2. Node 2 has now successfully written information to itself.

By being able to write to themselves, the nodes 1-6 can perform self tests. The node, such as node 2 above, can send data and address the data using the second virtual memory space 60 and then later check to ensure that the data was actually received into the second real memory location 56 of node 2. This would test the hub 32 and communication link 68, 70 connections.

Referring to FIGS. 21 and 22, the system 30 also includes the step of simultaneously sending the processed information to all of the indexed processors by simultaneously placing the destination addresses of each of the indexed processors onto the sent information. This is also know as broadcasting a message through the system 30. In the example shown in FIGS. 21 and 22, node 6 originates a message which is addressed to each of the nodes 1-6 in the system 30. The message or information is sent to the hub 32 across the associated incoming transmission line in the same manner as outlined above. The hub 32 determines that there are destination addresses for all of the nodes 1-6. This may be accomplished by choosing a special node number or I.D. which, if selected, automatically distributes the data to all nodes 1-6.

The message or information is then sent, without modification, across all of the outgoing transmission lines to each of the nodes 1-6 as shown in FIG. 22. The broadcasting is typically utilized for sending universally needed information, a shut down or start up message, an identify yourself message, or any like message or information.

FIG. 23 illustrates the broadcasting of information from node 4 in a multi system 30, i.e., multi hub, configuration. The information is sent from node 4 to each hub in which node 4 is connected. The hubs, which are shown as hub numbers 1, 2, and 3, in turn broadcast the information to each of their attached nodes 1-6. It should be appreciated, that a broadcast can be accomplished regardless of the configuration of the system 30.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of communicating across a distributed multiprocessing system having a first node with a first processor and a first real memory location and a second node with a second processor and a second real memory location, the first and second nodes are connected to a central signal routing hub by first and second communication links, respectively, said method comprising the steps of;

indexing the first and second nodes to define different destination addresses for each of the nodes;

processing information within the first processor of the first node for capturing a signal having an instantaneous value;

addressing the instantaneous value of the signal using at least one of the destination addresses;

transmitting the instantaneous value of the signal from the first processor of the first node across the first communication link toward the hub without storing the instantaneous value in the first real memory location of the first node to eliminate any unnecessary duplication of stored data and without the instantaneous value of the signal being requested, thereby defining a sending node;

receiving the instantaneous value of the signal along with the destination address within the hub;

identifying the destination address for the transmitted instantaneous value within the hub;

sending the instantaneous value of the signal without modification, without storing, and without the instantaneous value of the signal being requested from the hub over at least one of the communication links to at least one of the first and second nodes associated with the destination address, thereby defining at least one addressed node; and storing the instantaneous value of the signal within the real memory location of the addressed node for subsequent processing or evaluation wherein the step of storing the instantaneous value of the signal is further defined as storing the instantaneous value of the signal only moments before the addressed node requires the instantaneous value for the subsequent processing or evaluation.

2. A method as set forth in claim 1 wherein the step of processing information is further defined as compiling a plurality of instantaneous values within the first processor.

3. A method as set forth in claim 1 wherein the step of transmitting the instantaneous value of the signal is further defined as transmitting the instantaneous value along with executable code from the sending node to the addressed node.

4. A method as set forth in claim 2 wherein the step of transmitting the instantaneous value of the signal is further defined as transmitting the instantaneous value across the first communication link in only one direction from the first processor to the hub to define a send-only system.

5. A method as set forth in claim 4 wherein the step of sending the instantaneous value of the signal without modification is further defined as sending the instantaneous value from the hub over at least one of the communication links in only one direction from the hub to at least one of the first and second nodes to further define the send-only system.

6. A method as set forth in claim 1 further including the step of directing the first processor to a subsequent task to be performed while simultaneously sending the instantaneous value across the first communication link to the hub.

7. A method as set forth in claim 1 wherein the step of indexing the first and second nodes is further defined as indexing the nodes to define an identifier for each of the nodes for differentiating the nodes.

8. A method as set forth in claim 7 further including the step of creating a virtual memory map of each of the identifiers within each of the first and second nodes such that the first and second nodes can each address and forward an instantaneous value to each of the indexed nodes within the system.

9. A method as set forth in claim 8 wherein the step of addressing the instantaneous value of the signal is further defined as assigning a destination address onto the instantaneous value corresponding to the identifier of the addressed node.

10. A method as set forth in claim 1 wherein the step of addressing the instantaneous value of the signal further comprises the step of assigning a memory address onto the instantaneous value corresponding to a location of the real memory location of the addressed node.

11. A method as set forth in claim 7 further including the step of interconnecting the hub to a second hub, having third and fourth nodes, by a hub link.

12. A method as set forth in claim 11 further including the step of indexing the hubs to define a master hub and a secondary hub.

13. A method as set forth in claim 12 further including the step of indexing the first, second, third, and fourth nodes in accordance with the master and secondary hub indexes to redefine the identifiers for each of the nodes such that each of the nodes can be differentiated.

14. A method as set forth in claim 13 further including the step of simultaneously sending the instantaneous value to all of the indexed nodes by simultaneously placing the destination addresses of each of the indexed nodes onto the sent information.

15. A method as set forth in claim 14 further including the step of limiting the number of times that the instantaneous value can be sent from a sending nodes.

16. A distributed multiprocessing system comprising;
a first node and a second node with said nodes being separated from each other,
a first processor disposed within said first node for processing information, capturing a signal having an instantaneous value and for assigning a first address to a captured instantaneous value to define a first instantaneous value,
a first real memory location disposed within said first node for storing a captured instantaneous value at said first node,
a second processor disposed within said second node for processing information, capturing a signal having an instantaneous value and for assigning a second address to a captured instantaneous value to define a second instantaneous value,
a second real memory location disposed within said second node for storing a captured instantaneous value at said second node,
a central signal routing hub,
an indexer connected to said routing hub for indexing said first and second nodes to define different destination addresses for each of said nodes,
a first communication link interconnecting said first node and said hub for transmitting said first instantaneous value between said first processor of said first node and said hub without storing said first instantaneous value within said first real memory location of said first node to eliminate any unnecessary duplication of stored data and without said first instantaneous value being requested,
a second communication link interconnecting said second node and said hub for transmitting said second instantaneous value between said second processor of said second node and said hub without storing said second instantaneous value within said second real memory location of said second node to eliminate any unnecessary duplication of stored data and without said second instantaneous value being requested,
said central routing hub including a sorter for receiving at least one of said first and second instantaneous values from at least one of said first and second nodes, thereby defining at least one sending node, and for associating at least one of said first and second addresses of said first and second instantaneous values, respectively, with at least one of said destination addresses, and for sending at least one of said first and second instantaneous values without modification, without storing and without said first and second instantaneous values being requested from said hub over at least one of said communication links to said node associated with said destination address, thereby defining at least one addressed node, with said first and second real memory locations associated with said addressed node only storing said sent instantaneous value received from said hub for subsequent processing or evaluation wherein said addressed node receives said instantaneous value from said hub only moments before said addressed node requires said instantaneous value for the subsequent processing or evaluation.

17. A system as set forth in claim 16 wherein said first communication link includes first incoming and first outgoing transmission lines.

18. A system as set forth in claim 17 wherein said second communication link includes second incoming and second outgoing transmission lines.

19. A system as set forth in claim 18 wherein said first and second incoming transmission lines interconnect said first and second processors, respectively, to said hub for transmitting signals in only one direction from said first and second processors to said hub to define a send-only system.

20. A system as set forth in claim 19 wherein said first and second outgoing transmission lines interconnect said first and second processors, respectively, to said hub for transmitting signals in only one direction from said hub to said first and second processors to further define said send-only system.

21. A system as set forth in claim 20 wherein said first and second incoming transmission lines and said first and second outgoing transmission lines are unidirectional optical fiber links.

22. A system as set forth in claim 16 further including at least one actuator connected to at least one of said first and second nodes, respectively, for performing a testing operation during an operation of said system.

23. A system as set forth in claim 22 wherein said actuator is further defined as servo-hydraulic actuator.

24. A system as set forth in claim 16 wherein said indexer defines an identifier for each of said nodes for differentiating said nodes.

25. A system as set forth in claim 24 wherein said first and second nodes each include virtual memory maps of each identifier such that said first and second processors can each address and forward an instantaneous value to each of said indexed nodes within said system.

26. A system as set forth in claim 25 wherein each of said first and second processors further include a hardware portion for assigning said first and second addresses to said first and second, respectively.

27. A system as set forth in claim 26 wherein said hardware portion assigns a destination address onto said instantaneous value corresponding to said identifier of said addressed node.

28. A system as set forth in claim 27 wherein said first real memory location is connected to said hardware portion of said first processor and said second real memory location is connected to said hardware portion of said second processor.

29. A system as set forth in claim 28 wherein said hardware portion assigns a memory address onto said instantaneous value corresponding to a location of an associated first and second real memory location of said addressed node.

30. A system as set forth in claim 24 further including a second hub, having third and fourth nodes, interconnected to said first hub by a hub link.

31. A system as set forth in claim 30 wherein said indexer indexes said first and second hubs to define a master hub and secondary hub and indexes said first, second, third, and fourth nodes to redefine said identifiers for each of said nodes for differentiating said nodes.

32. A system as set forth in claim 31 further including a key disposed within one of said first and second hubs to determine which of said hubs will be defined as said master hub.

33. A system as set forth in claim 16 wherein each of said first and second processors further include at least one task.

34. A system as set forth in claim 33 wherein said processors include executable code for processing information defined by each of said tasks.

35. A system as set forth in claim 34 wherein said task includes at least a pair of pointers for directing a flow of said instantaneous value from said sending node to said destination node.

36. A system as set forth in claim 35 wherein said pointers includes a next task pointer for directing said sending processor to a subsequent task to be performed, and at least one data destination pointer for directing said first and second processor associated with said sending node to send said instantaneous value across said first communication link to said hub.

37. A system as set forth in claim 36 wherein said at least one data destination pointer includes a plurality of data destination pointers to direct said first and second processor associated with said sending node to simultaneously forward instantaneous value to a plurality of addressed nodes.

38. A system as set forth in claim 36 further including a chipset interconnected between each of said incoming and outgoing communication links and said corresponding processors for creating a virtually transparent connection therebetween.

39. A system as set forth in claim 38 further including a buffer disposed between each of said processors and said chipsets.

40. A system as set forth in claim 39 further including a counter for determining a number of times that an instantaneous value is sent to said addressed node.

41. A system as set forth in claim 40 further including a sequencer for monitoring and controlling a testing operation as performed by said system.

42. A system as set forth in claim 16 further including a host computer connected to one of said first and second nodes, said host computer having a processing card and at least one peripheral device.

43. A system as set forth in claim 42 wherein said peripheral devices are further defined as a monitor, a printer, a key board, and a mouse.

44. A system as set forth in claim 16 wherein said sorter includes hardware for determining said destination addresses of said addressed node.

45. A method as set forth in claim 7 wherein the step of indexing the first and second nodes is further defined as indexing the first and second nodes in a particular order for organizing the system.

46. A system as set forth in claim 16 wherein said indexer indexes said first and second nodes in a particular order for organizing said system.

47. A method as set forth in claim 1 further including the step of retrieving the stored instantaneous value of the signal from the real memory location of the addressed node by the addressed node only.

48. A method as set forth in claim 47 further including the step of processing the stored instantaneous value of the signal by the processor of the addressed node only.

49. A system as set forth in claim 16 wherein only said addressed node is capable of retrieving said stored instantaneous value within said real memory location of said addressed node.

50. A system as set forth in claim 49 wherein only said processor of said addressed node is capable of processing said stored instantaneous value within said real memory location of said addressed node.

* * * * *